United States Patent
Johnson et al.

(10) Patent No.: US 7,126,743 B2
(45) Date of Patent: Oct. 24, 2006

(54) ELECTROPHORETIC DISPLAY DEVICE AND DRIVING MEANS FOR RESTORING THE BRIGHTNESS LEVEL

(75) Inventors: Mark Thomas Johnson, Eindhoven (NL); Guo-Fu Zhou, Eindhoven (NL); Alexander Victor Henzen, Heerlen (NL); Michael Geoffrey Pitt, Kobe (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 4 days.

(21) Appl. No.: 10/506,272

(22) PCT Filed: Feb. 12, 2003

(86) PCT No.: PCT/IB03/00512

§ 371 (c)(1),
(2), (4) Date: Aug. 31, 2004

(87) PCT Pub. No.: WO03/075086

PCT Pub. Date: Sep. 12, 2003

(65) Prior Publication Data

US 2005/0152020 A1     Jul. 14, 2005

(30) Foreign Application Priority Data

Mar. 5, 2002 (EP) .................. 02075846

(51) Int. Cl.
  *G02B 26/00* (2006.01)
  *G09G 3/34* (2006.01)
(52) U.S. Cl. ..................... 359/296; 345/107
(58) Field of Classification Search ............... 359/296; 345/107

See application file for complete search history.

(56) References Cited

U.S. PATENT DOCUMENTS

| 6,842,165 B1 * | 1/2005 | Inoue ................... 345/107 |
| 2002/0036616 A1 * | 3/2002 | Inoue ................... 345/107 |

* cited by examiner

*Primary Examiner*—David N. Spector

(57) ABSTRACT

An electrophoretic display device (1) comprising one pixel (10) with an electrophoretic medium (13), electrodes (6, 7), as well as drive means (4) by which the pixels can be brought into different optical states. Some time (thold) after the application of an addressing pulse (Paddress) for setting the brightness level (Rw, Rb) of a pixel (10), a restore pulse voltage (Prestore) is applied between the electrodes (6,6',7) for restoring the brightness level of a pixel to the set level (Rw, Rb). The restore pulse may be a set of consecutive pulses to bring the drifted brightness level even more smoothly (i.e. less perceivably) back to the original brightness level.

17 Claims, 3 Drawing Sheets

ELECTROPHORETIC DISPLAY DEVICE AND DRIVING MEANS FOR RESTORING THE BRIGHTNESS LEVEL

The invention relates to an electrophoretic display device comprising at least one pixel with an electrophoretic medium, and at least two electrodes, as well as drive means by which the pixel can be brought into different optical states and which comprise an applicator means for applying a voltage difference between the electrodes. Where an electrode (or switching electrode) is mentioned in this application, it may be divided, if desired, into a plurality of sub-electrodes which are supplied with one and the same voltage either externally or via switching elements.

Electrophoretic display devices are based on the motion of charged, usually colored particles between two extreme states having a different transmissivity or reflectivity under the influence of an electric field. With these display devices, dark (colored) characters can be imaged on a light (colored) background, and vice versa.

Electrophoretic display devices are therefore notably used in display devices taking over the function of paper, referred to as "white paper" applications (electronic newspapers, electronic diaries).

In the known electrophoretic display devices with an electrophoretic medium between switching electrodes, the switching electrodes are supplied with drive voltages. The pixel may then be brought into a particular optical state. One of the switching electrodes is then realized, for example, as two mutually interconnected narrow conducting strips on the upper side of a display element. At a positive voltage across this switching electrode with respect to a bottom electrode covering the entire bottom surface of the display element, charged particles (negatively charged in this example) move to the potential plane which is defined by the two interconnected narrow conducting strips. The (negatively) charged particles spread across the front face of the display element (pixel), which then assumes the color of the charged particles. At a negative voltage across the switching electrode with respect to the bottom electrode, the (negatively) charged particles spread across the bottom face so that the display element (pixel) assumes the color of the liquid. Alternatively, the electrophoretic medium may comprise differently colored particles with different charges in a transparent fluid. In this situation, the pixel color is defined by the proportion of the colored particles which are visible from the viewing surface.

Displaying intermediate optical states (referred to as gray values) may also be done.

Different types of electrophoretic displays are known, most notably there are types in which the charged particles move vertically (transverse to the plane of the pixel element and driven by two continuous electrodes) and in which the charged particles move horizontally (in-plane).

Although these displays generally function reasonably, the brightness and contrast of the displayed image, which are among the most important properties of an electrophoretic display, tend to be less than optimal. As is known in the art and as the term is used herein, the 'brightness' of an image pixel refers to the range intensity levels from 'black' to 'white', or 'fully off' to 'fully on', and may also be referred to as 'greyscale', or 'grey level'.

It is an object of the present invention to improve the brightness and contrast of the display. In an electrophoretic display device according to the invention, the applicator means is arranged for applying, at a time after application of an addressing pulse for setting the brightness level of a pixel, a restore pulse voltage between the electrodes for restoring the brightness, or intensity level of a pixel to the set level in a substantially monotonic manner.

The invention is based on the recognition that electrophoretic displays are essentially bistable, i.e. a brightness or color level once set cannot be changed other than with a large change in voltage, herein called the switching pulse voltage, across the switching electrodes. However, over a period of time the brightness level tends to drift, i.e. pixels that immediately after setting of the brightness or color level have a certain set brightness, become in time grayer, white pixels becoming less white, and dark pixels becoming less dark. In a device in accordance with the invention, a relatively small pulse is applied between the switching electrodes some time after a switching pulse. The application of this pulse (hereafter also called 'top-up' pulse) counteracts the drift of the brightness and restores (or at least partially restores) the brightness of the pixel to the original value without, however, readdressing the pixel. The 'top-up' pulse has the same polarity as the addressing pulse but, in general, a far shorter duration than the pulse by which the original image was written.

The invention is based on the insight that loss of brightness is caused by a number of factors, including voltage leaking, gravity, and Brownian motion of the charged particles. This will lead to diffusion of the charged particles from their intended positions. Eventually, after a very long time, the charged particles will become more or less evenly distributed, thus leading to a gray image. A restoration or 'top-up' pulse will nudge the charged particles back to their intended positions, thus restoring the intended brightness and color.

It is noted that periodically resetting the pixel, i.e. blanking the image and then resetting the original image, will also improve the average brightness and contrast of the displayed image. However, the inventors have realized that such an operation is perceivable to the human eye because the image disappears during resetting. A viewer will lose sight of the image or text he/she is viewing and will have to refind the right part of the image. The display device in accordance with the invention does not show this problem. The image remains viewable throughout the application of the 'top-up' pulse.

In a preferred embodiment, the applicator means are arranged for applying, after the application of an addressing pulse for setting the brightness level of a pixel, a sequence of restore pulse voltages between the switching electrodes for restoring the set brightness level of a pixel.

In a preferred embodiment, the restoration of the set brightness is performed by a sequence of pulses rather than by one single pulse. The restoration is thus performed more smoothly and is less perceivable to the eye.

In a preferred embodiment, the device comprises a restoration function to manually restore the brightness of the display. In this embodiment it is the viewer him/herself who restores the brightness. This function may be a physical knob by which a 'top-up' pulse is initiated, or a part of the screen upon which an arrow can be moved by means of a computer mouse and subsequently 'clicked'.

In a preferred embodiment, the device comprises a means for making the time interval(s) between addressing pulses and restoration pulse(s) dependent on ambient temperature. Such devices preferably comprise a temperature sensor.

These and other aspects of the invention are apparent from and will be elucidated with reference to the embodiments described hereinafter.

In the drawings:

FIG. 1 diagrammatically shows a display device,

The Figures are diagrammatic and not drawn to scale; corresponding parts are generally denoted by the same reference numerals.

Figure 1:
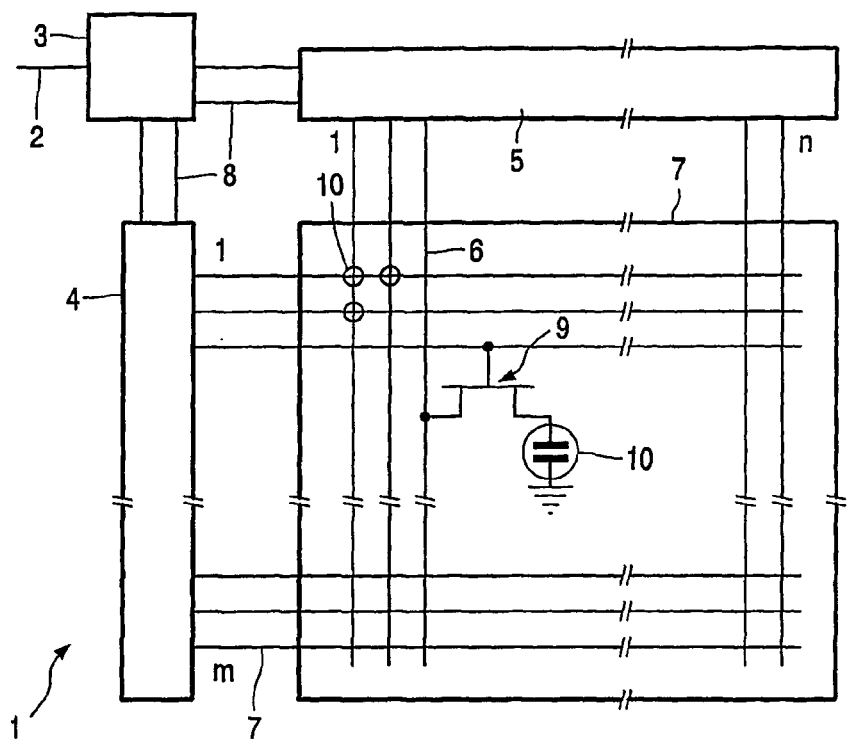

FIG. 1 shows an equivalent circuit diagram of a part of a display device 1 to which the invention is applicable. It comprises a matrix of pixels 10 at the area of crossings of row or selection electrodes 7 and column or data electrodes 6. The row electrodes 1 to m are consecutively selected by means of a row driver 4, while the column electrodes 1 to n are provided with data via a data register 5. To this end, incoming data 2 are first processed, if necessary, in a processor 10. Mutual synchronization between the row driver 4 and the data register 5 takes place via drive lines 8.

Drive signals from the row driver 4 and the data register 5 select a pixel 10 (referred to as passive drive). In known devices, a column electrode 6 acquires such a voltage with respect to a row electrode 7 so that the pixel assumes one of two extreme states at the area of the crossing (for example black or colored, dependent on the colors of the liquid and the electrophoretic particles).

If desired, drive signals from the row driver 4 may select the picture electrodes via thin-film transistors (TFTs) 9 whose gate electrodes are electrically connected to the row electrodes 7 and whose source electrodes 21 are electrically connected to the column electrodes 6 (referred to as active drive). The signal at the column electrode 6 is transferred via the TFT to a picture electrode, coupled to the drain electrode, of a pixel 10. The other picture electrodes of the pixel 10 are connected to, for example, ground, for example by means of one (or more) common counter electrode(s). In the example of FIG. 1, such a TFT 9 is shown diagrammatically for only one pixel 10.

In a display device according to the invention, each pixel may also be provided with a further electrode and drive means for supplying the further electrode with electric voltages. This is shown in FIG. 2, in which a cross-section of such a pixel provided with a third electrode 6' is shown. The drive means comprise, for example, the data register 5 (and possibly a part of the driver), and extra column electrodes 6' (and an extra TFT in the case of active drive).

A pixel 10 (FIG. 2) comprises a first substrate 11, for example of glass or a synthetic material, provided with a switching electrode 7, and a second, transparent substrate 12 provided with a switching electrode 6. The pixel is filled with an electrophoretic medium, for example a white suspension 13 containing, in this example, positively charged, black particles 14. The pixel is further provided with a third electrode 6' (and, if necessary, as described above, with drive means not shown in FIG. 2) so as to realize intermediate optical states via electric voltages across the third electrode.

Figure 2A:
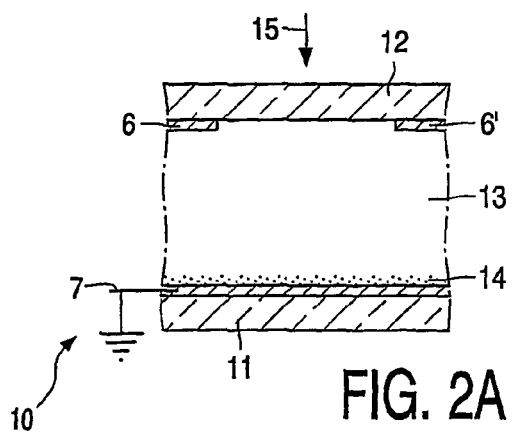
FIG. 2 shows a pixel of an electrophoretic display device in which different gray values (intermediate optical states) have been realized.
Figure 2B:
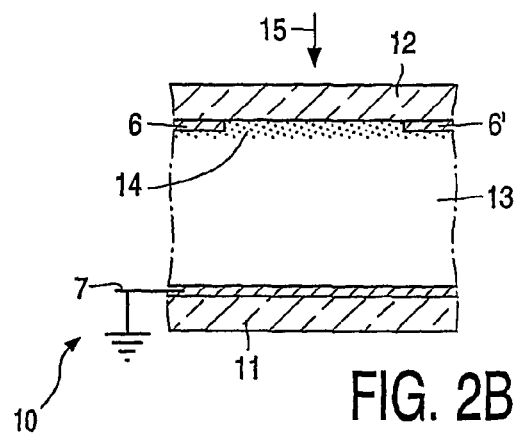

For example, in FIG. 2A, the switching electrode 7 is connected to ground, while both electrodes 6, 6' are connected to a voltage +V. The black particles 14 (positively charged in this example) move towards the electrode at the lowest potential, in this case the electrode 7. Viewed from the viewing direction 15, the pixel now has the color of the liquid 13 (which is white in this case). In FIG. 2B, the switching electrode 7 is connected to ground, while both electrodes 6, 6' are connected to a voltage −V. The positively charged, black particles 14 move towards the lowest potential, in this case towards the potential plane defined by the electrodes 6, 6', parallel to and just alongside the substrate 12. Viewed from the viewing direction 15, the pixel now has the color of the black particles 14.

Figure 2C:
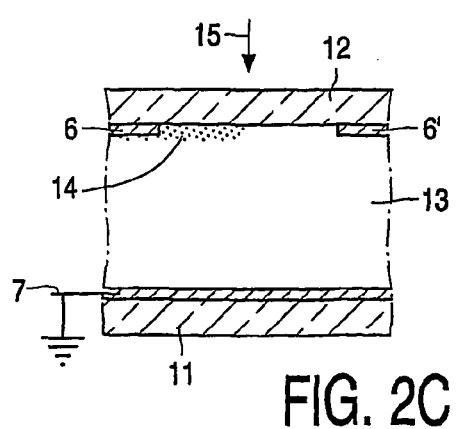
Figure 2D:
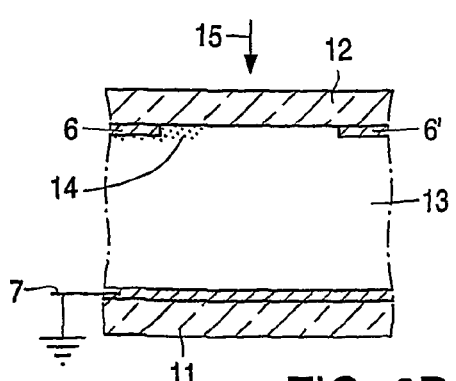

Also in FIG. 2C, the switching electrode 7 is connected to ground. The electrode 6 is again connected to a voltage −V. However, similarly as electrode 7, the third electrode 6' is now connected to ground. The positively charged, black particles 14 move towards the lowest potential, in this case an area around electrodes 6. This is even more strongly the case when the third electrode 6' is connected to a voltage +V, as is shown in FIG. 2D. Viewed from the viewing direction 15, the pixel now has only partly the color of the black particles 14 and partly the color of the white liquid. A gray hue is thereby obtained (dark gray in the case of FIG. 2C and light gray in the case of FIG. 2D). The above embodiments are given as an illustration of an electrophoretic device. Several different types of electrophoretic devices are possible, types in which the charged particles move upwards and downwards (i.e. transverse to the plane of the display) or laterally (i.e. lateral to the plane of the display device). In these further embodiments, only two electrodes (6,7) are required for operating the pixel.

The electrophoretic medium may be present in many forms. The display device in accordance with the invention encompasses embodiments in which the electrophoretic medium is present between two substrates, each of which is provided with a switching electrode, while at least one of the substrates is provided with the further electrode, as shown in FIGS. 2A to 2C. The charged particles may be present in a liquid between the substrates, but it is alternatively possible that the electrophoretic medium is present in a microcapsule. In the former case, the pixels may be mutually separated by a barrier.

In embodiments, the electrophoretic medium is present between two substrates, each of which is provided with an electrode. The charged particles may be present in a liquid between the substrates, but it is alternatively possible that the electrophoretic medium is present in a microcapsule. In the former case, the pixels may be mutually separated by a barrier.

In embodiments, the electrophoretic medium is present between two substrates, one of the substrates comprising the switching electrodes and the further electrode, notably when use is made of a lateral effect as described in "Development of In-Plane EPD", SID 2000 Digest, pp. 24–27.

In embodiments, the switching electrodes may be comb-shaped and interdigital, and parts of the (insulated) further electrode are situated between the fingers of the two switching electrodes. Alternatively, the electrophoretic medium may be present in a prismatic structure as described in "New Reflective Display Based on Total Internal Reflection in Prismatic Microstructures", Proc. 20.sup.th IDRC conference, pp. 311–314 (2000).

Figure 3:
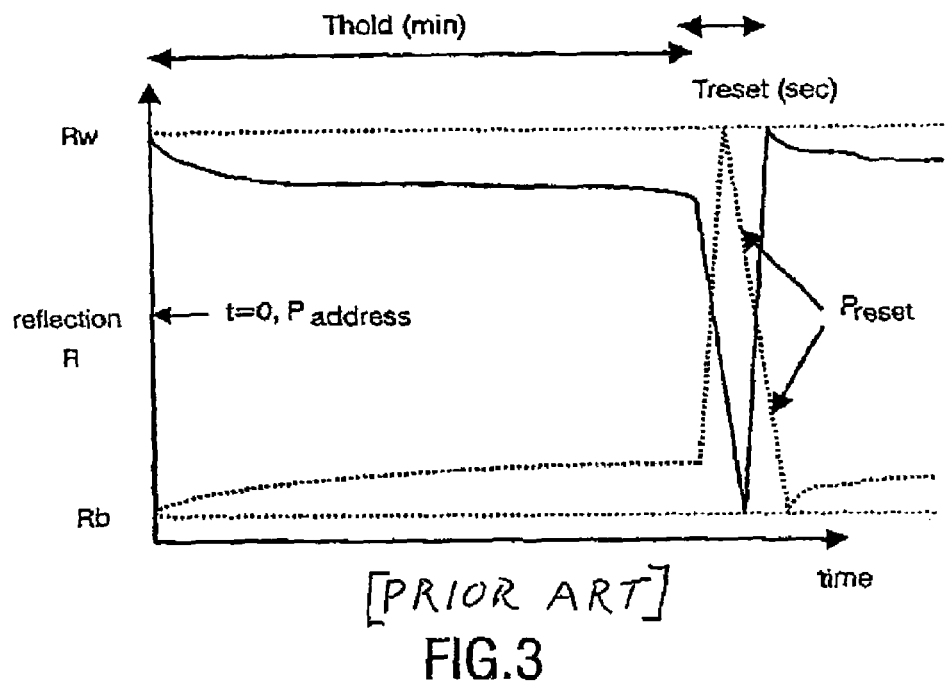
FIG. 3 illustrates the drift of a pixel and a method of correcting drift.

However, in all electrophoretic devices and embodiments, although the extent of the phenomena is dependent on the actual design of the electrophoretic display device, the bi-stability, even under ideal circumstances, will drift away over several minutes. In the displays, it is not unusual for residual DC voltages to arise (from all non-ideal details of the driving, such as kick-back effects). If DC voltages are present, the brightness of the electrophoretic display will drift even faster with time. This is illustrated in FIG. 3, in which the reflection R is shown as a function of time. Immediately after setting of the reflection level in this Figure at t=0 by means of a addressing pulse $P_{address}$, which level is Rw for a white pixel or Rb for a black pixel, the reflection starts to drift. The drifting reduces the brightness and contrast of the display. One method is to reset the display periodically by driving the entire display to white then to black and back to the original picture on the display. Periodically resetting the pixel, i.e. blanking the image and then resetting the original image, will also improve the average brightness and contrast of the displayed image in this Figure, illustrated schematically by the resetting pulse $P_{reset}$. However, the inventors have realized that such an operation is perceivable to the human eye because the image disappears during resetting. A viewer will lose sight of the image or text he/she is viewing and will have to refind the right part of the image.

The invention seeks to overcome the negative drift phenomena without the above-mentioned disadvantage.

In an electrophoretic display device according to the invention, the applicator means is arranged for applying, after application of an addressing pulse for setting the brightness level of a pixel, a restore pulse voltage between the switching electrodes for restoring the set brightness level of a pixel in a substantially monotonic manner.

Figure 4:
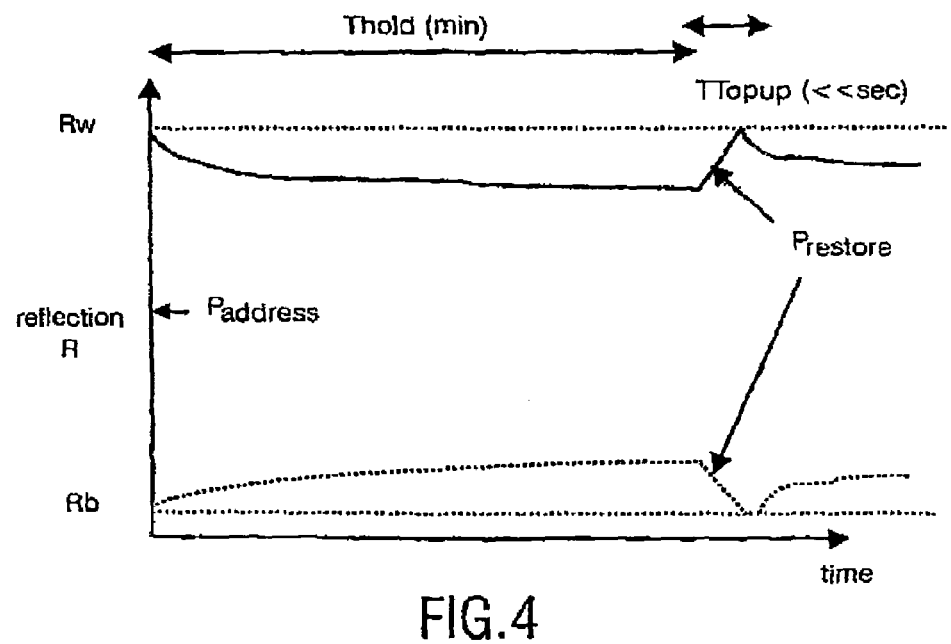
FIG. 4 illustrates the drift of a pixel and the method of correcting said drift in accordance with the invention.

In a device in accordance with the invention, a relatively small pulse $P_{restore}$ is applied between the switching electrodes 6 and 7 (or 6, 6' and 7) some time after a switching pulse $P_{address}$ The application of this pulse (hereafter also called 'top-up' pulse) counteracts the drift of the brightness and restores (or at least partially restores) the brightness of the pixel to the original value without resetting the pixel. The 'top-up' pulse has the same polarity as the addressing pulse but, in general, a far shorter duration than the pulse by which the original image was written. This is illustrated in FIG. 4, in which a 'top-up' pulse is illustrated which lasts for a short period of time (much less than a reset time or an addressing time, usually much less than a second), after which the pixels will have regained their original brightness, be it white or black. In contrast to resetting of the image as illustrated in FIG. 3, the pixels do not have their original image erased but have their brightness levels changed in a monotonic manner, i.e. the drifted brightness level is brought back to or near the original set level. The expression 'monotonic manner' implies that the brightness level is brought from the drifted value to or near the original set level without being driven in an opposing direction, which includes embodiments in which a (slight) overshoot is applied. In such 'overshoot' embodiments, the hold time may be slightly increased, which may be advantageous.

The invention may be used in various embodiments, some of which will be discussed below:

Embodiments for Minimizing Image Retention

The "top-up" approach is most easily applied to the black/white (or 8-color) displays, as the black and white states represent end situations in the electrophoretic pixel (with all particles as close to the electrodes as possible). In this case, the exact timing (and voltage) of the "top-up" pulse is less critical (if the pulse is too long, then the pixel cannot become "whiter than white"). In general, however, it is advisable to opt for the shortest possible "top-up" pulse, as this will avoid the build-up of additional unwanted DC voltages, which could lead to additional drift or even to image retention effects.

Embodiments for Gray Scale/Full-Color Displays.

Applying the "top-up" approach to a gray-scale (or full-color) display is more difficult, as now in addition a more detailed knowledge of the pulse duration will be required to avoid overshooting when trying to restore the original image. In principle, however, it will be possible to achieve this within a given display if sufficient knowledge is available of the (data-dependent) DC in the display, and the response of the electrophoretic pixels with different gray scales to the "top-up" pulses. This information, if recorded in a look-up table, will allow the use of the "top-up" approach to gray-scale displays. As the display response is strongly temperature-dependent, a preferred embodiment of this invention will incorporate a temperature sensor, and also multiple, temperature-dependent look-up tables to determine the details of the "top-up" pulse.

In general, the "top-up" pulse will be provided after a given period of time, depending upon the rate at which the gray levels drift. In many situations, the user will be able to accept a considerable drift in the brightness before a disturbing reduction in image quality is perceived, especially if the drift is gradual. The "top-up" rate will also be related to external details such as temperature: in general, the drift will occur more rapidly at higher temperature. In a preferred embodiment, the "top-up" rate will increase as the display temperature increases (i.e. shorter bistable hold period between 2 "top-up" pulses). To this end, the device may be provided with a temperature sensor, the output of which is coupled to the means for applying a 'top-up' pulse, or alternatively the circuit for applying a 'top-up' pulse may comprise, for example, a sub-circuit whereby the 'top-up' rate is determined, which sub-circuit comprises a temperature-dependent element (for example a resistor whose resistance value is temperature-dependent) whereby the 'top-up' rate is made temperature-dependent. Yet different methods and manners and embodiments to relate the 'top-up' rate to ambient temperature were discussed above in relation to the 'gray-scale top-up approach', which methods and manners are, however, also applicable to black and white displays.

Figure 5:
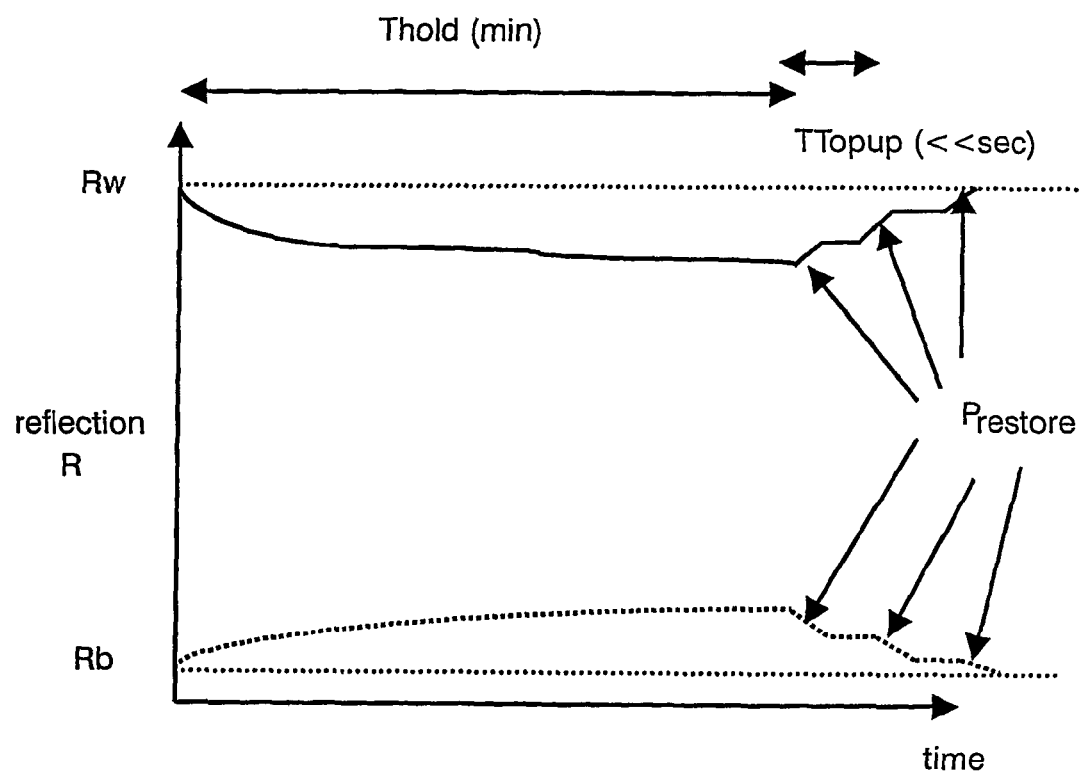
FIG. 5 illustrates a sequence of 'top-up' pulses for restoration of set brightness in accordance with this invention.

In a preferred embodiment, the restoration of the set brightness is performed by a sequence of pulses rather than by one single pulse. The restoration is thus performed more smoothly and is less perceivable to the eye. Such a sequence of 'top-up' pulses is illustrated in FIG. 5.

It is noted that the expression 'in a monotonic manner' is to be understood within the scope of the invention such that the brightness level is brought back from the drifted level to the original level in a consistent manner. The use of a series of pulses increases the smoothness of the restoration of the brightness level. In embodiments in which such a series of pulses is applied, there will be a slight lapse in the brightness level (due to drift) in between two pulses of the series of pulses, which lapse is actually in the opposite direction from the overall 'monotonic' change in brightness level. 'In a monotonic manner' is thus to be understood within the scope of the invention to mean a transition in a consistent direction, beginning at the drifted level and ending at or near the original level, and should not be misinterpreted in a purely mathematical manner, since such would be unduly restrictive.

In some situations, the user may prefer that the image is restorable at will to its optimum state (for example to show an image to multiple users, demonstrations). In this case, a user-defined "top-up" pulse could be used. A preferred embodiment of a device incorporating a display according to the present invention would incorporate a button (either a physical switch or, more probably, a software button) which allows the user to restore the image to its optimum state.

The protective scope of the invention is not limited to the embodiments described.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The invention claimed is:

1. An electrophoretic display device comprising:
   at least one pixel with an electrophoretic medium,
   at least two electrodes, and
   a driver that is configured to bring the pixel into different optical states by applying a voltage difference between the electrodes,
   wherein:
   the driver is configured to apply, at a time after application of an addressing pulse for setting an intensity level of the pixel, a sequence of restore pulse voltages between the electrodes for restoring the intensity level of the pixel in a substantially monotonic manner.

2. The electrophoretic display device of claim 1, wherein the device comprises a restoration function for manually restoring the brightness of the display.

3. An electrophoretic display device comprising:
   at least one pixel with an electrophoretic medium,
   at least two electrodes, and
   a driver that is configured to bring the pixel into different optical states by applying a voltage difference between the electrodes,
   wherein
   the driver is configured to apply, at a time after application of an addressing pulse for setting an intensity level of the pixel, a restore pulse voltage between the electrodes to restore the intensity level of the pixel in a substantially monotonic manner,
   a time period between applying the restore pulse voltage and the addressing pulse being dependent on an ambient temperature.

4. The electrophoretic display device of claim 3, wherein the time period decreases as the ambient temperature increases.

5. The electrophoretic display device of claim 3, wherein the display device is provided with a temperature sensor, the output of which is coupled to the driver for applying a restore pulse.

6. The electrophoretic display device of claim 3, wherein the driver includes a sub-circuit for determining the time period, comprising a temperature-dependent element whereby the time period is made temperature-dependent.

7. The electrophoretic display device of claim 3, wherein the display device is provided with a temperature sensor, and
   the driver is configured to use data that relates the temperature to the time period.

8. The electrophoretic display device of claim 7, wherein the data is stored in a memory as a table.

9. The electrophoretic display device of claim 1, wherein the display device is provided with a temperature sensor, the output of which is coupled to the driver for applying the restore pulse.

10. The electrophoretic display device of claim 1, wherein the driver includes a sub-circuit for determining the time period, comprising a temperature-dependent element whereby the time period is made temperature-dependent.

11. The electrophoretic display device of claim 1, wherein the display device is provided with a temperature sensor, and
    the driver is configured to use data that relates the temperature to the time period.

12. The electrophoretic display device of claim 11, wherein
    the data is stored in a memory as a table.

13. The electrophoretic display device of claim 3, wherein the device includes a restoration function for manually restoring the brightness of the display.

14. The electrophoretic display device of claim 4, wherein the display device is provided with a temperature sensor, the output of which is coupled to the driver for applying a restore pulse.

15. The electrophoretic display device of claim 4, wherein the driver includes a sub-circuit for determining the time period, comprising a temperature-dependent element whereby the time period is made temperature dependent.

16. The electrophoretic display device of claim 4, wherein the display device is provided with a temperature sensor, and
    the driver is configured to use data that relates the temperature to the time period.

17. The electrophoretic display device of claim 16, wherein
    the data is stored in a memory as a table.

* * * * *